(12) United States Patent  
Yamamoto et al.

(10) Patent No.: US 8,352,208 B2  
(45) Date of Patent: Jan. 8, 2013

(54) METHOD FOR EVALUATING TREE PRODUCTION CAPACITY, IMAGE CAPTURE DEVICE FOR EVALUATING TREE PRODUCTION CAPACITY, AND PROGRAM FOR EVALUATING TREE PRODUCTION CAPACITY

(75) Inventors: Haruhiko Yamamoto, Yamaguchi (JP); Kiyoshi Iwaya, Yamaguchi (JP); Yasushi Tsuchiya, Yamaguchi (JP)

(73) Assignee: Yamaguchi University, Yamaguchi-shi, Yamaguchi (JP)

( * ) Notice: Subject to any disclaimer, the term of this patent is extended or adjusted under 35 U.S.C. 154(b) by 960 days.

(21) Appl. No.: 12/097,314

(22) PCT Filed: Dec. 15, 2006

(86) PCT No.: PCT/JP2006/325084  
§ 371 (c)(1), (2), (4) Date: Mar. 24, 2009

(87) PCT Pub. No.: WO2007/069736  
PCT Pub. Date: Jun. 21, 2007

(65) Prior Publication Data  
US 2009/0281733 A1 Nov. 12, 2009

(30) Foreign Application Priority Data

Dec. 15, 2005 (JP) .................. 2005-361386  
Oct. 3, 2006 (JP) .................. 2006-272055

(51) Int. Cl.  
*G01B 5/26* (2006.01)

(52) U.S. Cl. .................. 702/127; 702/156; 356/629

(58) Field of Classification Search .................. 702/127, 702/156, 182; 356/627–629  
See application file for complete search history.

(56) References Cited

FOREIGN PATENT DOCUMENTS

| JP | 2003-344048 A | 12/2003 |
| JP | 2005-253407 A | 9/2005 |
| JP | 2007171033 A | * 7/2007 |
| JP | 2008111725 A | * 5/2008 |

OTHER PUBLICATIONS

International Search Report of PCT/JP2006/325084 and date of mailing Mar. 27, 2007.

* cited by examiner

*Primary Examiner* — Manuel L Barbee  
(74) *Attorney, Agent, or Firm* — Westerman, Hattori, Daniels & Adrian, LLP

(57) ABSTRACT

Evaluation of tree production capacity by a non-destructive method using a tree crown structure measurement device or using an image capture device with a fisheye lens mounted, for isolated trees or for trees existing at intervals, is enabled without requiring a large amount of time.

A semi-spheroid of revolution model is established as a representation of the outer shape of a tree, an optical tree structure measurement device is placed at a position apart from the main trunk by a prescribed distance, the intensity of light passing through tree leaves and the intensity of light not passing through tree leaves are measured, the optical path length of light incident on the tree is calculated using the semi-spheroid model and the total tree leaf area is determined from the measured light intensities and optical path length. The total tree leaf area is also determined by placing an image capture device with a fisheye lens mounted in place of an optical tree structure measurement device and performing data processing of image data acquired by image capturing.

3 Claims, 7 Drawing Sheets

METHOD FOR EVALUATING TREE PRODUCTION CAPACITY, IMAGE CAPTURE DEVICE FOR EVALUATING TREE PRODUCTION CAPACITY, AND PROGRAM FOR EVALUATING TREE PRODUCTION CAPACITY

FIELD OF THE INVENTION

This invention relates to a method for evaluating tree production capacity, an image capture device for evaluating tree production capacity and a program for evaluating tree production capacity.

BACKGROUND OF THE INVENTION

In the past, various methods have been studied for non-destructive estimation of the leaf areas of tree, which is one index of tree production capacity; one of these is a method in which the total tree leaf area is estimated by measuring light transmitted by tree leaves using an optical tree structure measurement device. Here, an optical tree structure measurement device is placed in positions below isolated trees or below a plurality of trees existing at intervals, light transmitted by tree leaves is measured, and the data obtained is used to estimate the total leaf area of tree to evaluate tree production capacity.

The following references disclose using a Plant Canopy Analyzer (PCA, a product name) as an optical tree structure measurement device to estimate the leaf area of trees.

Non-patent Reference 1

Takayuki Nakano, "Application of Plant Canopy Analyzer for Mature Tea (*Camellia sinensis* L.) Bush" (Japanese Journal of Crop Science, 69(3): 419-423 (2000))

Non-patent Reference 2

J. S. Broadhead et al, "Comparison of method for leaf area in tree rows", Agricultural and Forest Meteorology, 115:151-161 (2003))

In Non-patent Reference 1, a Plant Canopy Analyzer is applied to diagnosis of the leaf area of rows of tea bushes which constitute an isolated plant canopy. During measurements, the PCA is directed toward the bush center portion, a view cap with an aperture of 90° was mounted in order to regulate the field in the azimuthal direction (horizontal direction), and a field-regulating filter is mounted in order to regulate the field in the zenith angle direction from 0° to 60°. In this method, estimating leaf area, calculations are performed assuming a uniform population and in the case of tea bushes the quantity of branches is large compared with leaf groups, so the leaf area index is over-evaluated, thus making use in leaf area estimation difficult.

In Non-patent Reference 2, a Plant Canopy Analyzer was applied to estimation of the leaf area density (ratio of the area of leaves per unit volume) for rows of trees (*Croton megalocarpus, Melia volkensil*) in a savanna in Kenya, and assuming the cross-section of tree rows to be elliptical and using the estimated optical path lengths, the leaf area density was calculated based on a method of calculation for isolated trees. Using this method, the correlation between calculation results and actually measured leaf area densities is low, and consequently the zenith angle distribution of inclination angles for individual leaves is newly measured, and the correlation between calculation results obtained from a model based on this and measured values is heightened. However, because a new model is added, considerable time and effort are required to measure the inclination angles of individual leaves, and so this cannot be said to be a practical method.

A PCA (Plant Canopy Analyzer: U.S. LI-COR model LAI-2000) is a representative optical tree structure measurement device currently in use. As shown in FIG. 1, this device comprises a lens system including a fisheye lens which captures light within an incident angle range of 148° at the tip end, a reflecting mirror, a filter and a detector. In the detector, photosensitive elements of silicon are disposed in a concentric circular array, so as to detect light with five different zenith angles. Data obtained in measurements by the detector is processed and control of data transfer to a computer is executed.

The PCA is generally used for measurements of plant canopies, which have a radial-direction spreading of three or more times the height z of the population and which have a uniform leaf area distribution and a uniform height according to the azimuthal directions with a cross-sectional shape such as that shown in FIG. 2. In this case, the optical path length $S(\theta)$ at the zenith angle $\theta$, at which the transmissivity of a population is measured on the earth's surface, is estimated using the following equation.

$$S(\theta)=z/\cos \theta$$

However, in the case of an isolated plant canopy (a single isolated tree or similar) for which the assumption of the above equation is not adapted, in general there are a need for measurement of transmitted light with the sensor at the base of the trunk and oriented toward the outside of the plant canopy and also a need for measurement of optical path length at zenith angle $\theta$ at the measurement point. Because the shape of an isolated plant canopy and the leaf area are not uniform but variable depending on the azimuthal direction, it is necessary to make measurements in approximately four azimuthal directions, and consequently length measurements must be performed in a total of 20 cases (five optical path lengths×four compass directions). Further, because the sensor is directed outward of the plant canopy, the middle upper portion of the population is not subjected to measurements. Also, because what is obtained in this method is the leaf area density (the leaf area per unit volume of tree), measurements for the volume of the plant canopy must be performed as another step in order to calculate the total leaf area.

The inventor measured transmitted light for tree of 33 citrus trees using a PCA and, assuming a plant population with a substantially uniform leaf area distribution and height with azimuthal direction as described above, estimated tree leaf areas. As a result, the relation between the leaf area index (the ratio of the leaf area per unit area) as measured by a PCA and the tree crown leaf area index (the ratio of the leaf area to the area of the tree crown projected onto the ground) is shown in FIG. 3, where the correlation is low (r=0.418) with considerable dispersion regardless of the magnitude of the leaf area density. Conceivable reasons for this low correlation between the leaf area index measured by PCA and the tree crown leaf area index include the fact that the citrus trees measured are not a tree canopy having uniform height, for which a PCA is originally intended.

A conventional method of tree crown leaf area estimation using an optical tree crown structure measurement device cannot be applied to trees having only old leaves (leaves which have lasted through winter) with low leave area densities, and measurement is often difficult, and there has also been such a problem that the ratio of new leaves (newly developed leaves which have not lasted through winter) to old leaves cannot be evaluated. Further, when estimating the tree crown leaf area of trees which are isolated or which exist at intervals and do not constitute a tree group with uniform height, much time is required for estimation, and inevitably there is only low correlation between the leaf area index obtained as a result of measurement and the tree crown leaf area index. Hence it has been sought to execute estimation without requiring much time, to heighten the correlation between the leaf area index obtained as a result of measurement and the tree crown leaf area index and to reduce required expenses.

SUMMARY OF THE INVENTION

This invention was devised in order to resolve the above problems. In one aspect of this invention, a method for evaluating tree production capacity by measuring light transmitted by a tree for a tree existing in isolation or for each of a plurality of trees existing at an interval is provided, which comprises the steps of: determining a semi-spheroid model based on an upward-convex semi-spheroid in which the main trunk of one tree is taken as an axis and a tree height and an average tree crown radius are taken as two radii; measuring an intensity of light incident at a plurality of zenith angles for measurement and passing through tree leaves using an optical tree structure measurement device placed at a position close to the ground and apart from the main trunk by a prescribed distance so that an incident optical axis is directed upward in a vertical direction with respect to a horizontal plane; measuring an intensity of light incident at the plurality of zenith angles for measurement which does not passing through tree leaves using said optical tree structure measurement device placed at a position at which light from the sky is not blocked so that the incident optical axis is directed upward in the vertical direction with respect to the horizontal plane; determining a gap fraction at the plurality of zenith angles from both of the intensity of light incident at the plurality of zenith angles and passing through the tree leaves and the intensity of light not passing through the tree leaves; calculating an optical path length from an incident point on a surface of the semi-spheroid by the semi-spheroid model to the optical tree structure measurement device of incident light at the plurality of zenith angles for measurement and a tree crown volume based on the semi-spheroid model; determining an amount of attenuation of light corresponding to each of the zenith angles from the gap fraction at the plurality of zenith angles and from the optical path length corresponding to the plurality of zenith angles; and determining a leaf area density from the amount of attenuation of light and then determining a total tree leaf area from the determined leaf area density and the tree crown volume.

It may be so arranged that the gap fraction $T(\theta_i)$ at the plurality of zenith angles is determined from the intensities of the measured incident light at the plurality of zenith angles by using the following equation (1),

[E1]

$$T(\theta_i) = \frac{\text{light intensity at lower portion of plant canopy at zenith angle } (\theta_i)}{\text{light intensity at upper portion of plant canopy at zenith angle } (\theta_i)} \quad (1)$$

and the leaf area density (LAD) is determined by using the following equation (2)

[E2]

$$LAD = -2\sum_{i=1}^{5} \frac{\ln(T(\theta_i))w(\theta_i)}{S(\theta_i)} \quad (2)$$

In another aspect of this invention, a method for evaluating tree production capacity by measuring light transmitted by a tree for a tree existing in isolation or for each of a plurality of trees existing at an interval is provided, which comprises the steps of: determining a semi-spheroid model based on an upward-convex semi-spheroid in which the main trunk of one tree is taken as an axis and a tree height and an average tree crown radius are taken as two radii; placing an image capture device with fisheye lens mounted, at a position close to the ground and apart from the main trunk by a prescribed distance so that an incident optical axis is directed upward in a vertical direction with respect to a horizontal plane; capturing images formed by incident light of field-angle containing a plurality of zenith angles for measurement with the image capture device; executing data processing to determine a sky factor of incident light at the plurality of zenith angles for image data acquired by the image capture device; calculating an optical path length from an incident point on a surface of the semi-spheroid by the semi-spheroid model to the image capture device of incident light at the plurality of zenith angles for measurement and a tree crown volume based on the semi-spheroid model based on the semi-spheroid model; determining an amount of attenuation of light corresponding to the plurality of zenith angles from both of the sky factor of incident light from each of the plurality of zenith angles and the optical path length corresponding to the plurality of zenith angles; and determining a leaf area density from the amount of attenuation of light and determining a total tree leaf area from the determined leaf area density and the tree crown volume.

It may be so arranged that the sky factor $T(\theta_i)$ for incident light at the plurality of zenith angles is determined for an image captured by the image capture device by using the following equation (5)

[E5]

$$T(\theta_i) = \frac{\text{numberof leaf gap pixels at zenith angle } (\theta_i)}{\text{total numberof pixels at zenith angle} (\theta_i)} \quad (5)$$

and the leaf area density (LAD) is determined by using the following equation (2)

[E2]

$$LAD = -2\sum_{i=1}^{5} \frac{\ln(T(\theta_i))w(\theta_i)}{S(\theta_i)} \quad (2)$$

It may also be so arranged that the semi-spheroid model is an upward-convex semi-ellipsoid of revolution model in which the main trunk of one tree is taken as an axis and a tree height and an average tree crown radius are taken as two radii.

In still another aspect of this invention, an image capture device for evaluating tree production capacity is provided, which comprises a fisheye lens; an image capture element disposed at the image-forming position of the fisheye lens; an image capture operation control portion; a processing circuit which performs data processing of image data acquired by the image capture element; and an output portion which outputs processed results of the processing circuit, characterized in that, while measuring light transmitted through a tree for a tree existing in isolation or for each of a plurality of trees existing at an interval, said processing circuit is so arranged as to perform: processing image data acquired by image capturing with the image capture device placed at a position close to the ground and apart from the main trunk by a prescribed distance so that the incident optical axis is directed upward in a vertical direction with respect to a horizontal plane to determine sky factors over a plurality of angular ranges from the image data of image portions of a plurality of angular ranges containing each of the plurality of zenith angles for measurement respectively, determining an optical path length from an incident point on a surface of the semi-spheroid by the semi-spheroid model to the image capture device and a tree crown volume, determining an amount of attenuation of light corresponding to an angular range containing each of the zenith angles from the sky factors and the optical path length corresponding the plurality of zenith angles and determining a leaf area density from said determined amount of attenuation of light and determining a total tree leaf area from the determined leaf area density and the tree crown volume.

It may be so arranged that the processing circuit is so arranged as to perform data processing to determine the sky factor $T(\theta_i)$ for incident light at the plurality of zenith angles by using the following equation (5),

[E5]

$$T(\theta_i) = \frac{\text{number of leaf gap pixels at zenith angle } (\theta_i)}{\text{total number of pixels at zenith angle } (\theta_i)} \quad (5)$$

and to determine the leaf area density (LAD) by using the following equation (2)

[E2]

$$LAD = -2\sum_{i=1}^{5} \frac{\ln(T(\theta_i))w(\theta_i)}{S(\theta_i)} \quad (2)$$

It may also be so arranged that the semi-spheroid model is an upward-convex semi-ellipsoid of revolution model in which the main trunk of one tree is taken as an axis and a tree height and an average tree crown radius are taken as two radii.

In still another aspect of this invention, a program for executing data processing on a computer for evaluating tree production capacity when measuring light transmitted by a tree for a tree existing in isolation or for each of a plurality of trees existing at an interval is provided, in which said data processing is arranged to comprise: determining a gap fraction at a plurality of zenith angles from both of an intensity of light transmitted by trees measured by an optical tree structure measurement device placed at a position close to the ground and apart from the main trunk by a prescribed distance so that an incident optical axis is directed upward in a vertical direction with respect to a horizontal plane at a plurality of zenith angles and an intensity of light not passing through tree leaves at the plurality of zenith angles measured with an optical tree structure measurement device placed at a position at which light from the sky is not blocked so that the incident optical axis is directed upward in the vertical direction with respect to the horizontal plane; determining an amount of attenuation of light corresponding to each zenith angle for the tree from a tree crown volume and an optical path length of light incident with the plurality of zenith angles on an incident point on the surface of the semi-spheroid by the semi-spheroid model to the optical tree structure measurement device, said optical path length being determined based on a semi-spheroid model for an upward-convex semi-spheroid in which the main trunk of the tree is taken as the axis and the tree height and average crown radius are taken as two radii; and determining a leaf area density from said determined amount of attenuation of light and determining a total tree leaf area from the determined leaf area density and the tree crown volume.

It may be so arranged that the porosity $T(\theta_i)$ at the plurality of zenith angles is determined from the measured intensity of incident light at a plurality of zenith angles by using the following equation (1)

[E1]

$$T(\theta_i) = \frac{\text{light intensity at lower portion of plant canopy at zenith angle } (\theta_i)}{\text{light intensity at upper portion of plant canopy at zenith angle } (\theta_i)} \quad (1)$$

and the leaf area density (LAD) is determined by using the following equation (2)

[E2]

$$LAD = -2\sum_{i=1}^{5} \frac{\ln(T(\theta_i))w(\theta_i)}{S(\theta_i)} \quad (2)$$

In still another aspect of this invention, a program for executing data processing on a computer for evaluating tree production capacity when measuring light transmitted through a tree for a tree existing in isolation or for a plurality of trees existing at an interval is provided, in which said data processing is arranged to comprise: determining a sky factor in a plurality of angular ranges from an image data of an image portion in a plurality of angular ranges respectively comprising the plurality of zenith angles for measurement for images captured and acquired by an image capture device with fisheye lens mounted which is placed at a position close to the ground and apart from the main trunk by a prescribed distance so that an incident optical axis is directed upward in a vertical direction with respect to a horizontal plane; determining an optical path length from an incident point on a surface of the semi-spheroid by the semi-spheroid model to the image capture device of incident light at the plurality of zenith angles and a tree crown volume based on a semi-spheroid model determined as an upward-convex semi-spheroid in which the main trunk of one tree is taken as an axis and a tree height and an average tree crown radius are taken as two radii; determining an amount of attenuation of light corresponding to the angular ranges containing the zenith angles from the sky factor and from the optical path length corresponding to the plurality of zenith angles; and determining a leaf area density from said determined amount of attenuation of light and determining a total tree leaf area from the determined leaf area density and the tree crown volume.

It may be so arranged that the gap fraction $T(\theta_i)$ for incident light at the plurality of zenith angles is determined for image data acquired for angles of field containing incident light from a plurality of zenith angles by using the following equation (5)

[E5]

$$T(\theta_i) = \frac{\text{number of leaf gap pixels at zenith angle } (\theta_i)}{\text{total number of pixels at zenith angle } (\theta_i)} \quad (5)$$

and the leaf area density (LAD) is determined by using the following equation (2)

[E2]

$$LAD = -2\sum_{i=1}^{5} \frac{\ln(T(\theta_i))w(\theta_i)}{S(\theta_i)} \quad (2)$$

It may also be arranged that the semi-spheroid model is an upward-convex semi-ellipsoid of revolution model in which the main trunk of one tree is taken as an axis and a tree height and an average tree crown radius are taken as two radii.

In this invention, by measuring the light transmitted by trees using an optical tree structure measurement device, applying a semi-spheroid model to isolated trees or to trees existing at intervals, or by capturing images of angles of field containing incident light from a plurality of zenith angles for measurement using an image capture device with a fisheye lens mounted, such advantageous results are given that the total tree leaf area can be appropriately evaluated for trees with low leaf area densities and for trees with old leaves alone, and that measurement results comparable to those of the case of actual measurements with a high correlation between leaf area index and tree crown leaf area index can be obtained without requiring considerable time and effort. Moreover, by using an image capture device with a fisheye lens mounted, the costs incurred in executing measurements can be reduced.

DETAILED DESCRIPTION OF PREFERRED EMBODIMENTS

In this invention, when estimating the total tree leaf area for either isolated trees or for trees existing at intervals, which do not constitute a tree canopy with a uniform height, a semi-spheroid model is established for each tree, and, on the basis of this model, data obtained either using optical tree structure measurement means or using an image capture device with a fisheye lens mounted is used to determine the leaf area index, according to which the tree production capacity is evaluated. So, evaluation of the tree production capacity using a semi-spheroid of revolution model will be explained in the first place.

[A] Evaluation of Tree Production Capacity Using a Semi-Spheroid Model

Figure 1:
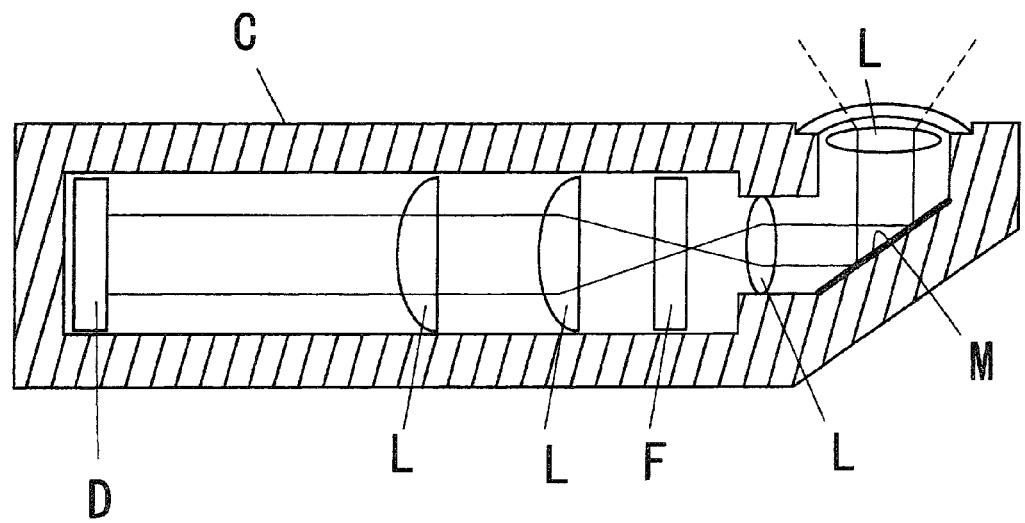
FIG. 1 shows in summary the configuration of a tree crown structure measurement device.
Figure 2:
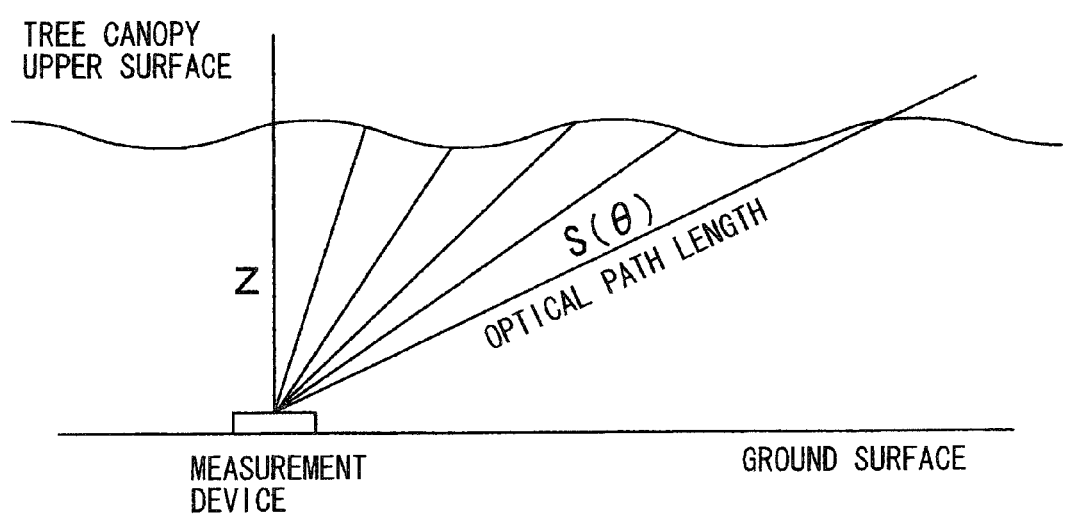
FIG. 2 shows the cross-sectional shape of a general tree canopy to be measured.
Figure 3:
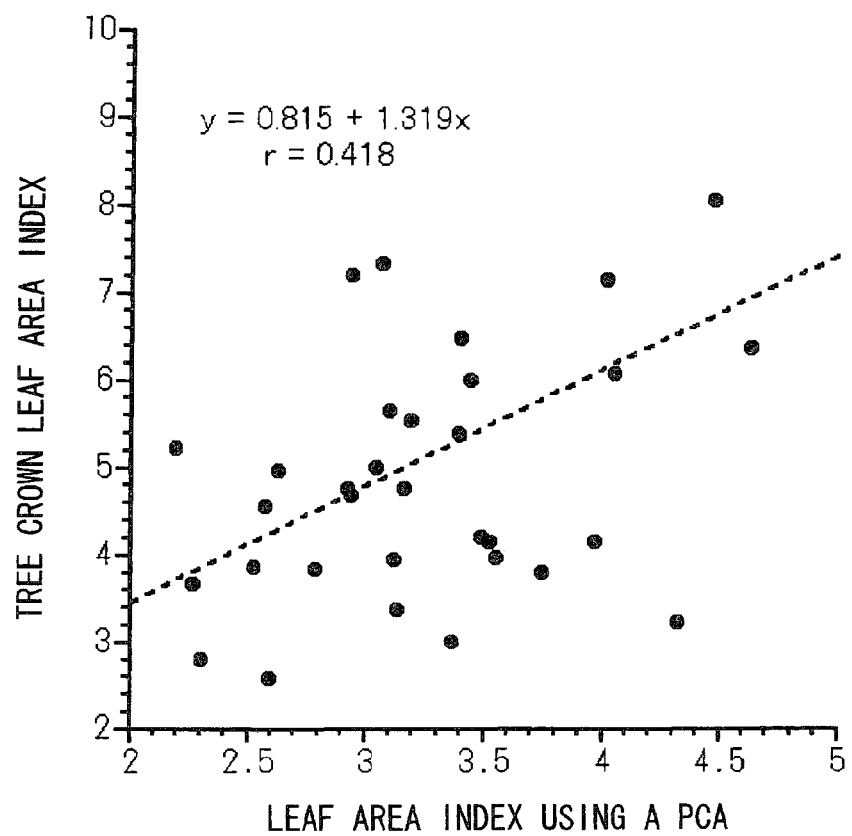
FIG. 3 is a graph showing the relation between the leaf area index and crown area index, obtained by a conventional method using a PCA.
Figure 4:
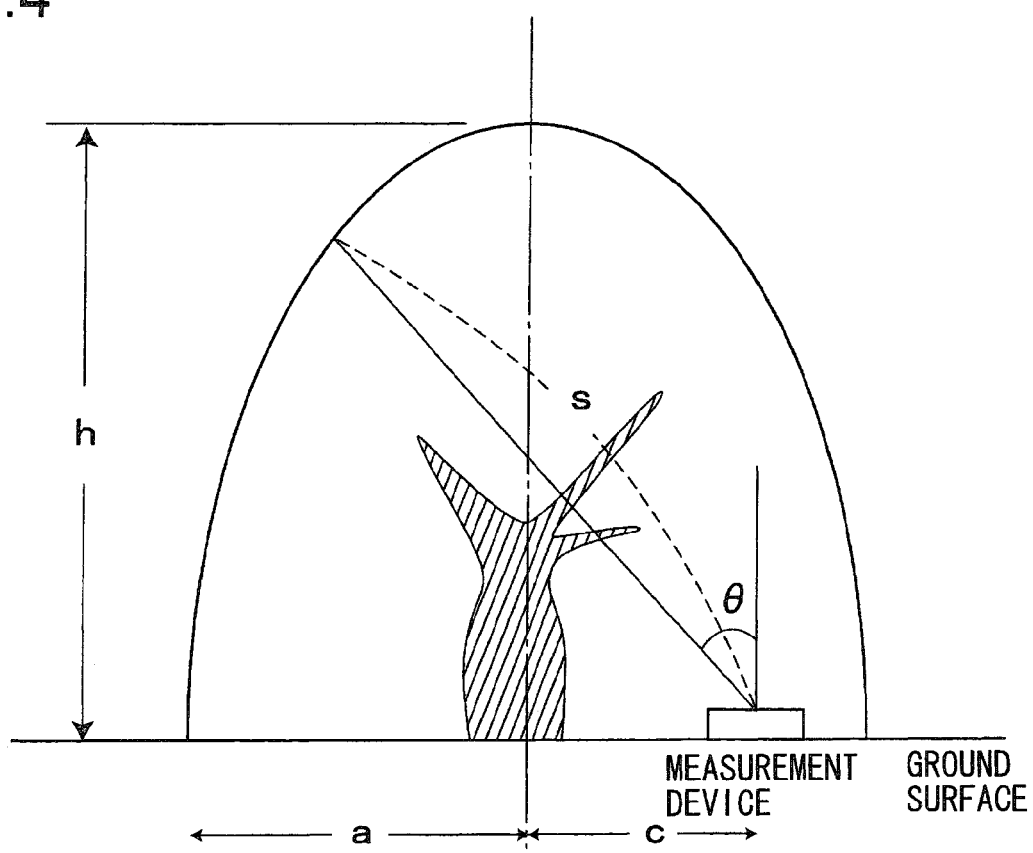
FIG. 4 is a schematic view which explains a semi-ellipsoid of revolution model.

FIG. 4 shows a semi-ellipsoid of revolution model, as an example of a semi-spheroid of revolution model. This model takes the cross-sectional shape of a tree to be an upward-convex semi-ellipse in which the tree height and the average crown radius are taken as the major axis and minor axis respectively. A solid of revolution obtained with either the major axis or the minor axis as the axis of revolution is taken to represent the tree. In FIG. 4, the height of the tree in this ellipsoid of revolution model is h, and the radius is a. The quantities h and a are determined according to individual trees. S is the optical path length of light incident on the ellipsoid of revolution model, from the point of incidence on the ellipsoid of revolution surface to the measurement point on the ground, and variable with the zenith angle θ (the angle between the measurement direction and the direction perpendicular to the ground surface).

The intensity of light incident at a plurality of zenith angles for measurement through the tree leaves is measured with an optical tree structure measurement device placed near the ground at a position apart from the main trunk surface by a distance c and, moreover, the intensity of light at a plurality of zenith angles not passing through tree leaves is measured with the optical tree structure measurement device placed at a position at which light from the sky is not blocked, and then the gap fractions at a plurality of zenith angles are determined. Otherwise, an image capture device with a fisheye lens mounted is placed near the ground at a position apart from a main trunk surface by a distance c, images of field angles comprising a plurality of zenith angles for measurement are captured and then the acquired image data is processed to determine the sky factors for light incident at a plurality of zenith angles for measurement.

[B] Measurement Using an Optical Tree Structure Measurement Device

An example will be explained in which a Plant Canopy Analyzer (PCA), as a representative optical tree structure measurement device, is used to evaluate actual tree production capacity based on an ellipsoid of revolution model and the validity of measurements is verified for a case of citrus trees. In this case of citrus trees, the main trunk diameter was approximately 10 cm, and the distance c from the main trunk surface was set to approximately several tens of centimeters (20 to 100 cm). With the value of c being set, the PCA was placed near the ground and apart from the main trunk surface by distance c so that the incident optical axis might be directed upward in the vertical direction, and the intensity of light transmitted by the tree leaves (the light intensity in the lower portion of the plant canopy) was measured. Also, the PCA was arranged in a position at which light from the sky was not blocked, with the incident optical axis directed upward in the vertical direction, and the incident light intensity (light intensity in the upper portion of the plant canopy) at a plurality of zenith angles was measured. As a position at which light from the sky is not blocked, a height equal to, or higher than tree height may be preferred. The intensity of light transmitted by tree leaves at the five different zenith angles θ ($\theta_1, \theta_2, \ldots, \theta_5$) in FIG. 4 is measured with the PCA. For the used PCA, the zenith angles θ were 7°, 22°, 38°, 52° and 68°, respectively.

Measurements using the PCA result in underestimation under conditions in which direct light from the sun is dominant, hence it is desirable for obtaining a good result that measurements are performed on cloudy days when sunlight is not directly received and scattered light is dominant or on fine days of clear skies when the sun is low in the sky and the effect of direct light is minimal such as in the early morning or evening.

In the case of a semi-ellipsoid of revolution model, the optical path lengths $S(\theta_1), S(\theta_2), \ldots, S(\theta_5)$ for each of the zenith angles $\theta_1, \theta_2, \ldots, \theta_5$ from the point of incidence on the semi-ellipsoid of revolution surface by the semi-ellipsoid of revolution model to the measurement point, are determined. However, due to the fact that the measurement position at which the PCA is placed is deviated from the main trunk which is the axis of the semi-ellipsoid of revolution, the optical path lengths vary with the azimuthal direction. Consequently, it is necessary to stipulate the azimuthal directions of optical path lengths. Here, the optical path lengths in a azimuthal direction from the PCA position toward the base of the main trunk are taken to be $S(\theta_1)$ to $S(\theta_5)$. The amounts of attenuation of light quantity are determined from the intensities of light transmitted by tree leaves as measured by the PCA for each optical path (the light intensities in the lower portion of the plant canopy), the intensities of light not transmitted by leaves (the light intensity in the upper portion of the plant canopy) and the optical path lengths ($S(\theta_i)$). The total tree leaf area (LA) is calculated by multiplying the leaf area density (LAD), obtained using the semi-ellipsoid of revolution model, by the tree volume (V) calculated from dimension data obtained likewise using the semi-ellipsoid of revolution model.

First, equation (1) is used to determine the gap fractions (transmissivities) $T(\theta_i)$ for the zenith angles $\theta_i$:

[E1]

$$T(\theta_i) = \frac{\text{light intensity at lower portion of plant canopy at zenith angle}(\theta_i)}{\text{light intensity at upper portion of plant canopy at zenith angle}(\theta_i)} \quad (1)$$

The $T(\theta_i)$ obtained in this way and equation (2) are used to determine the leaf area density (LAD), where $w(\theta_i)$ are weighting coefficients for each of the zenith angles.

[E2]

$$LAD = -2 \sum_{i=1}^{5} \frac{\ln(T(\theta_i)) w(\theta_i)}{S(\theta_i)} \quad (2)$$

Next, the tree crown volume (V) according to the semi-ellipsoid of revolution model is calculated using equation (3).

[E3]

$$V = \frac{4\pi}{3} \frac{R_m^2 \times H}{2} \quad (3)$$

where $R_m$ is the average crown radius (m), and H is the tree height (m).

From equations (2) and (3), the total leaf area (LA) is calculated using equation (4).

[E4]

$$LA = LAD \times V \quad (4)$$

In this invention, measurements based on a semi-ellipsoid of revolution model were performed with a PCA for 19 citrus trees. The PCA was placed at a ground position apart from the base of the main trunk by a distance of 60 cm, directed toward the center portion of the trees. As to items for measurement, measurements were made for transmitted light in four azimuthal directions as directions from the PCA toward the tree center portion and for the dimensions of the trees (5 dimensions: the tree crown radii in the four azimuthal directions and a tree height). Because tree shapes are assumed to be upward-convex semi-ellipsoids of revolution having an average crown radius obtained by averaging the crown radii in four azimuthal directions, the crown volume (V) and the optical path lengths at the measurement point for each of the zenith angles $\theta$ can be estimated with the above-mentioned measurements for five dimensions.

Figure 5:
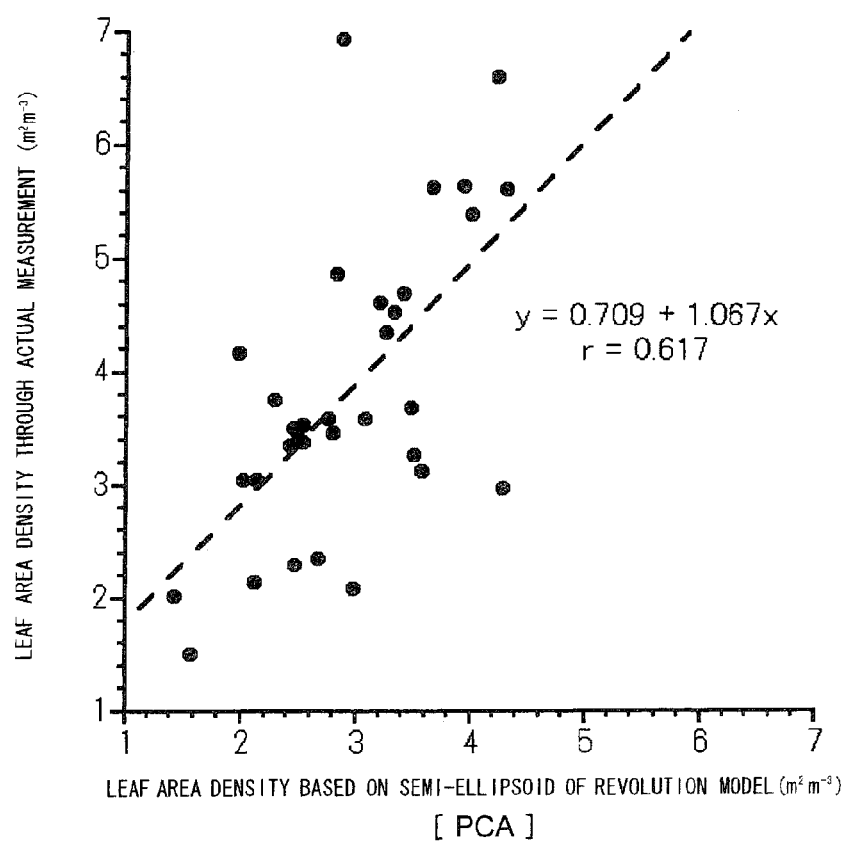
FIG. 5 is a graph showing the relation between the leaf area density obtained based on a semi-ellipsoid of revolution model using a PCA and the leaf area density obtained from actual measurements.

On the other hand, tree leaf areas were determined by actual measurements, for the purpose of comparison. Here, the number of leaves on a tree was counted, the areas of several tens of leaves selected as samples were measured, and from these the total leave area was determined. The results shown in FIG. 5 were obtained by comparing the leaf area density for trees (LAD: leaf area per unit volume of tree) obtained by above-described measurements using a PCA with the leaf area density obtained by actual measurements. In this case, the inclination of the regression line was substantially 1 and a considerably high correlation (r=0.617) was obtained.

Figure 6:
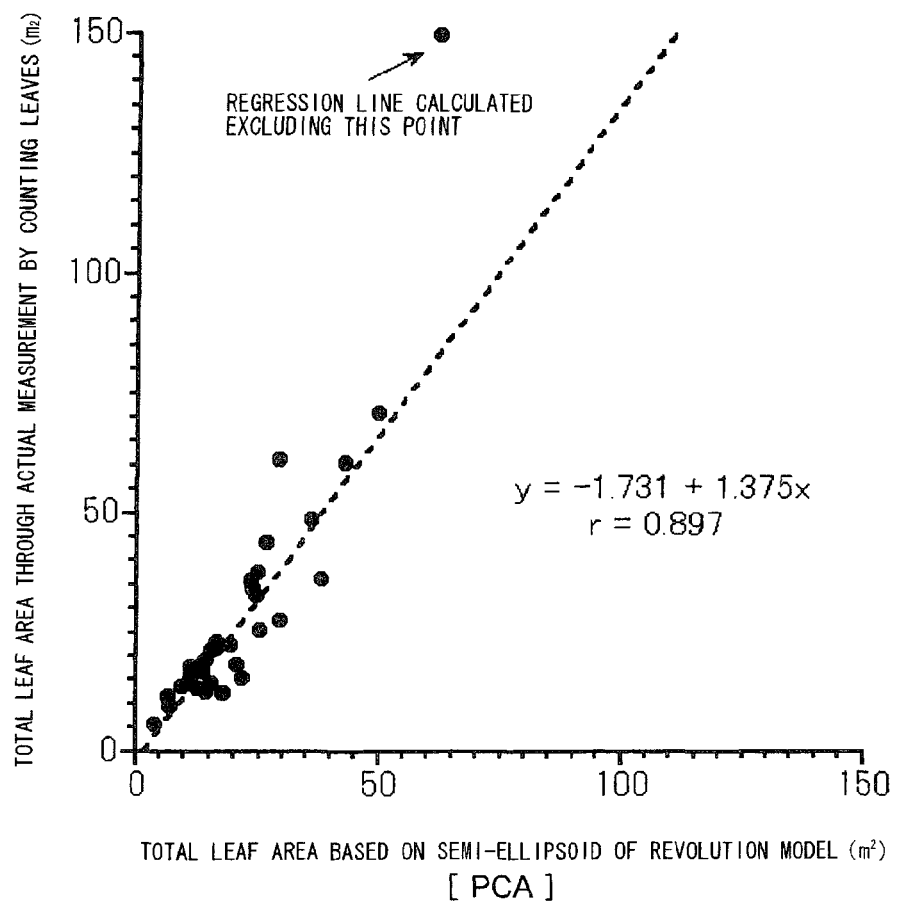
FIG. 6 is a graph showing the relation between the total tree leaf area obtained based on a semi-ellipsoid of revolution model employing a PCA and the total tree leaf area obtained from actual measurements.

FIG. 6 shows the relation between the total tree leaf area obtained using a PCA based on a semi-ellipsoid of revolution model and the total tree leaf area obtained by actual measurements. In the figure, considerable deviation appears at only one point for an extremely large tree, but as a whole extremely high correlation (r=0.897) was obtained.

In this embodiment of the invention, a shape obtained by revolving an upward-convex semi-ellipse about a center axis was considered as the semi-spheroid model, while this is a technique for calculating optical path lengths using a model. The cross-sectional shape of the solid of revolution need not necessarily be an ellipse as a simple quadratic curve, but another curve which enables calculation of optical paths may be used. Thus, the semi-spheroid may be considered to be a more general solid of revolution including a semi-ellipsoid of revolution or a semi-sphere as a special case, and appropriate shapes can be used according to the form of the trees.

Conventional methods of estimation of the tree crown leaf area index using a PCA cannot be applied to trees with low leaf area densities, and moreover, calculations for trees with old leaves alone and evaluation of new-old leaf ratios are difficult. This is also because during the process, in which the leaf area of a tree having only old leaves increases due to the development of new leaves, both the leaf area density and the tree volume increase, while also in this respect, it can be said that the method of total leaf area estimation using a semi-spheroid model and a PCA of this invention is extremely effective for evaluating tree production capacity.

In a conventional method of total leaf area estimation using a PCA, the semi-ellipsoid of revolution model of this invention is not employed, and so it is necessary to measure the optical path lengths at 20 places (optical path lengths at 5 places×4 azimuthal directions), and in order to calculate the total leaf area from the leaf area density, the volume of the plant canopy must be measured separately, so that much time and effort is required for measurement; further, the PCA is placed at the base of a main trunk and directed outward, and this may cause the upper portion of the tree center portion to be out of extent of measurement, so that satisfactory measurement results are difficult to obtain. On the other hand, when using a total leaf area measurement method of this invention, these problems are resolved, and the time required for implementation can be said to be one third or less than the time required by using a conventional method.

[C] Measurement Using an Image Capture Device with a Fisheye Lens Mounted

Based on a semi-spheroid of revolution model, the total tree leaf area can be estimated through measurements using an image capture device (digital camera) with a fisheye lens mounted as the optical measurement means. In this invention, an upward-convex semi-ellipsoid of revolution model such as shown in FIG. 4 is considered as a semi-spheroid model; an image capture device equipped with a circular fisheye lens, with a field angle of 184°, is placed near the ground at a position apart from the surface of a main trunk by a distance c of 30 cm with the lens directed upward in the vertical direction and images are captured to perform measurements. The weather, time and other conditions during image capturing are similar to those when using a PCA.

In an image capture device, an image which represents a two-dimensional brightness distribution can be obtained using an image capture element (CCD). By inputting the image to a personal computer and performing image analysis to calculate the sky factor, the total leaf area can be determined, similarly to the case of using a PCA. In a PCA system, the intensity of light transmitted by tree leaves is measured for the directions of five zenith angles $\theta_1, \theta_2, \ldots, \theta_5$ (7°, 22°, 38°, 52°, 68°) by five photosensitive elements disposed concentrically. When using images captured by an image capture device, after dividing the brightnesses distributed in an image into two portions, i.e. portions of the tree body containing a trunk and leaf group and other portions (mainly, the sky) and then converting the brightness value into two digits (0 and 1), the number of pixels in the tree portions (black) and in the sky portions (white) are counted for angular ranges (0 to 14°, 15 to 29°, 30 to 44°, 45 to 59°, 60 to 74°) centered on the respective five zenith angles $\theta_1, \theta_2, \ldots, \theta_5$. Equation (5) is then used to determine the sky factors $T(\theta_i)$:

[E5]

$$T(\theta_i) = \frac{\text{number of leaf gap pixels at zenith angle } (\theta_i)}{\text{total number of pixels at zenith angle } (\theta_i)} \quad (5)$$

The sky factor is a quantity which is stipulated as comparable to the gap fraction in cases in which an optical tree structure measurement device is used. The sky factor was calculated for a fan-shape portion with a central angle of 90°, directed toward the main trunk portion among all captured azimuthal direction ranges. This sky factor $T(\theta_i)$ and the optical path lengths $S(\theta_i)$ determined using the semi-ellipsoid of revolution model are used with equation (2) to determine the leaf area density LAD:

[E2]

$$LAD = -2 \sum_{i=1}^{5} \frac{\ln(T(\theta_i)) w(\theta_i)}{S(\theta_i)} \quad (2)$$

where $w(\theta_i)$ are weighting coefficients for each of the zenith angles, and $T(\theta_i)$ is the sky factor corresponding to a zenith angle. Then, based on the semi-ellipsoid of revolution model, the tree crown volume (V) is determined using equation (3):

[E3]

$$V = \frac{4\pi}{3} \frac{R_m^2 \times H}{2} \quad (3)$$

where $R_m$ is the average crown radius (m), and H is the tree height (m). From equations (6) and (3), the total leaf area (LA) is calculated using equation (4):

[E4]

$$LA = LAD \times V \quad (4)$$

In calculation of the leaf area density, the value at angle 68° (60 to 74°) which includes a large part of the main trunk portion in the image is excluded.

In this way, through data processing of image data acquired by image capturing using an image capture device with a fisheye lens mounted, the total tree leaf area can be determined. On the other hand, actual measurement values are obtained by counting the number of leaves on a tree, measuring the area of several tens of leaves selected as samples and determining the total leaf area from the data.

Figure 7:
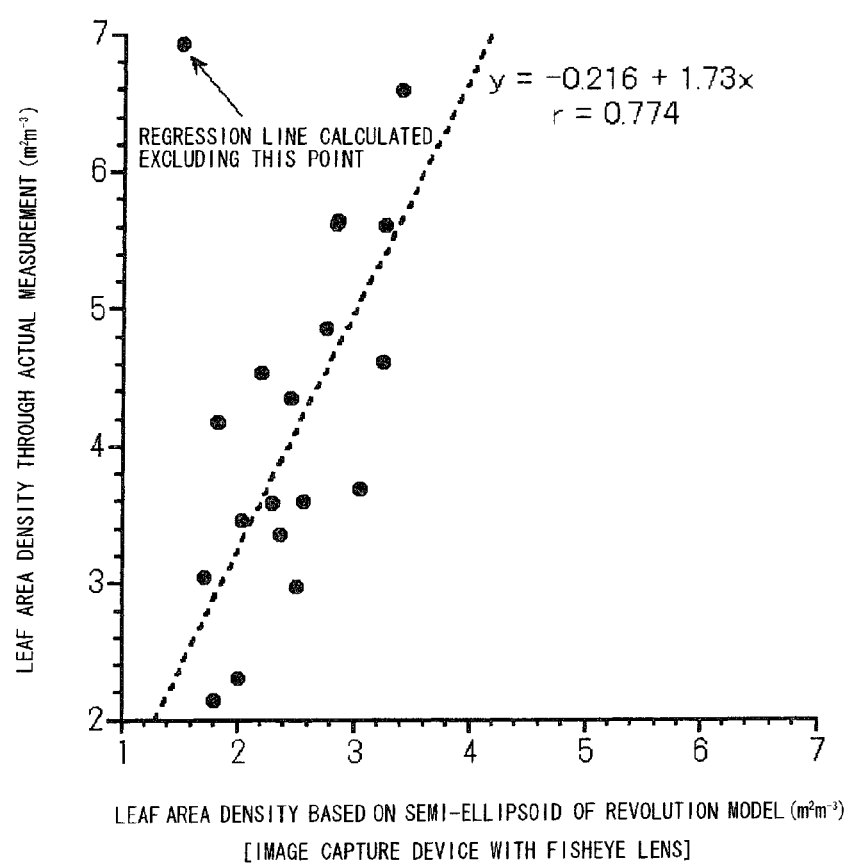
FIG. 7 is a graph showing the relation between the leaf area density of trees obtained based on a semi-ellipsoid of revolution model using an image capture device with a fisheye lens mounted and the leaf area density obtained from actual measurements.

Upon comparing the leaf area densities (LADs) of trees obtained by measurements using images obtained with an image capture device with a fisheye lens mounted and leaf area densities obtained by actual measurements, the results shown in FIG. 7 were obtained. In this case, a higher correlation is obtained than when using a PCA (with $R^2$ values of 0.553 and 0.472 respectively), and the tendency toward underestimation was greater in this case of using an image capture device with a fisheye lens mounted. This is thought to occur because of different extents of influence on the measurement equipment when there is overlapping of leaves; though, in the case of images obtained using an image capture device with a fisheye lens mounted, evaluation is not possible unless overlapping appears in the image no matter how many leaves overlap in an image, in the case of using a PCA the transmitted light is measured so that the overlapping of leaves can be evaluated to some extent.

Figure 8:
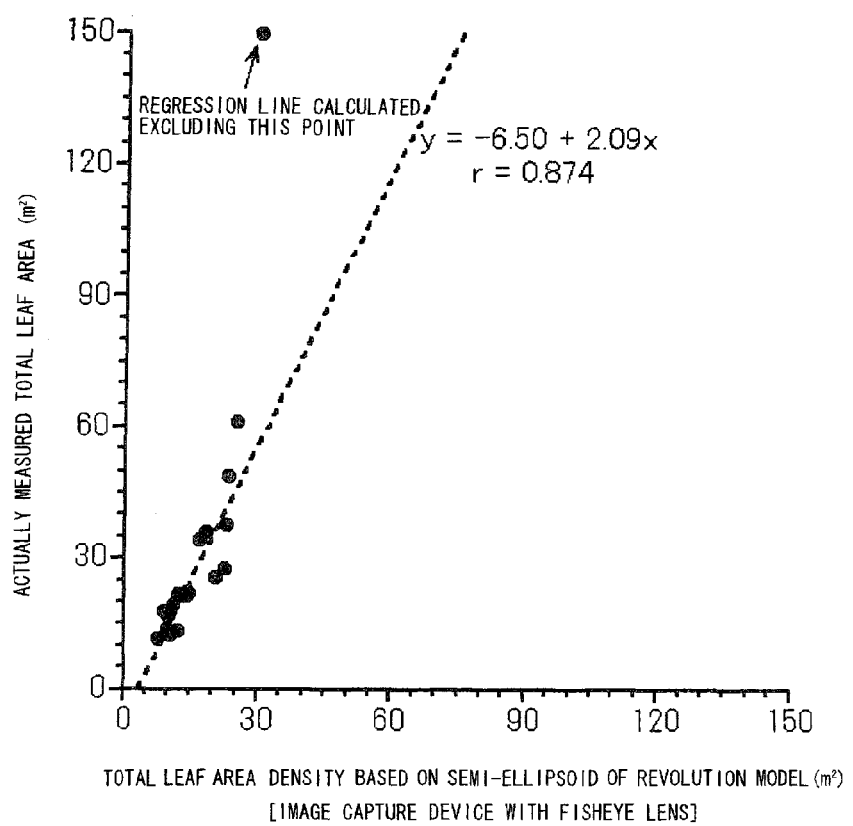
FIG. 8 is a graph showing the relation between the total tree leaf area obtained based on a semi-ellipsoid of revolution model using an image capture device with a fisheye lens mounted and the total tree leaf area obtained from actual measurements; and, FIG. 9 shows in summary the configuration of an image capture device with a fisheye lens mounted.

Upon comparing total tree leaf areas obtained by measurement using an image capture device with a fisheye lens mounted based on a semi-ellipsoid of revolution model with the total tree leaf areas obtained by actual measurement, the results shown in FIG. 8 were obtained. Excluding one point having a value greatly deviating from the other values, high correlation was obtained for the case of an image capture device with a fisheye lens mounted (with $R^2$ values of 0.764 and 0.790 respectively) in a manner similar to the case of using a PCA.

When using an image capture device with a fisheye lens mounted, the costs required for measurement can be reduced below even those incurred in the case of using a PCA. Further, when using a PCA the photosensitive elements are of concentric ring shapes corresponding to each of the zenith angles, so that measurement results may be affected by intense light received at one point on the photosensitive element, but in the case of a digital camera as an image capture device where results of light received by each of numerous pixels are used, so that such influence of intense light can be said to be minimal.

In addition to these, it can be said also in the case of using an image capture device with a fisheye lens mounted that the cross-sectional shape in the vertical direction of the semi-spheroid model may be other oval shapes than an ellipse, similarly as in the case of using a PCA.

Figure 9:
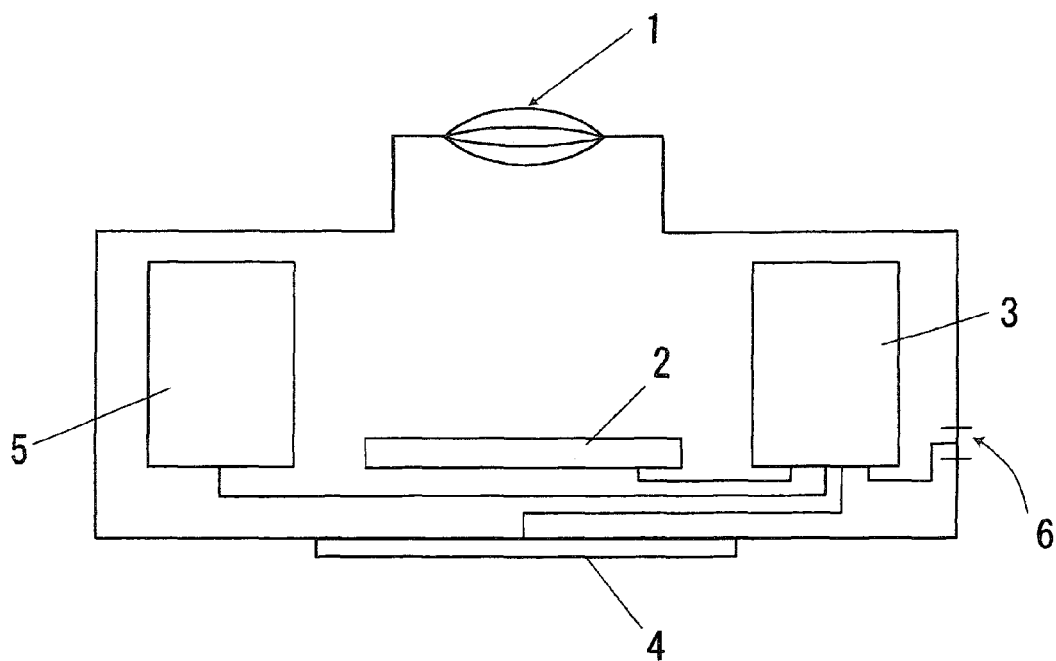

As shown in FIG. 9, an image capture device with a fisheye lens mounted for use in evaluating tree production capacity comprises a constitution as an image capture device including a fisheye lens 1 as an image forming optical element, image capture element (CCD) 2, image capture driving circuit 3 and display unit 4 as well as a processing circuit 5 to determine the sky factor for a plurality of zenith angles and to determine the leaf area density and total tree leaf area. The processing circuit 5 may be of an IC chip incorporated into the body of the image capture device, or may be in the form of a circuit unit connected via an I/O terminal 6 of the image capture device. Such an incorporated-type processing circuit or externally connected processing circuit unit further comprises input means for entering parameters necessary for data processing (tree height, average crown radius, and similar).

When an image capture device with a fisheye lens mounted does not incorporate a processing circuit, either a memory card which stores images captured by the image capture device can be used to evaluate tree production capacity employing a personal computer, or image data can be transferred via a cable to a personal computer from an I/O terminal of the image capture device and then the personal computer can be used to perform data processing to evaluate tree production capacity. Thus, this invention can also be characterized as a program for performing data processing with a computer to determine leaf area density and total tree leaf area from image data acquired by an image capture device in this way, based on a semi-spheroid model.

The invention claimed is:

1. An image capture device for evaluating tree production capacity, comprising: a fisheye lens; an image capture element disposed at the image-forming position of the fisheye lens; an image capture operation control portion; a processing circuit which performs data processing of image data acquired by the image capture element; and an output portion which outputs processed results of the processing circuit, characterized in that, while measuring light transmitted by a tree for the tree existing in isolation or for each of a plurality of trees existing at an interval, said processing circuit is so arranged as to perform:

processing image data acquired by image capturing with the image capture device placed at a position close to the ground and apart from the main trunk by a prescribed distance so that an incident optical axis is directed upward in a vertical direction with respect to a horizontal plane to determine sky factors over a plurality of angular ranges from the image data of image portions of a plurality of angular ranges containing each of the plurality of zenith angles for measurement respectively, determining an optical path length from an incident point on a surface of the semi-spheroid by the semi-spheroid model to the image capture device and a tree crown volume, determining an amount of attenuation of light corresponding to an angular range containing each of the zenith angles from the sky factors and the optical path length corresponding the plurality of zenith angles, and determining a leaf area density from said determined amount of attenuation of light and determining a total tree leaf area from the determined leaf area density and the tree crown volume.

2. The image capture device for evaluating tree production capacity according to claim 1, characterized in that the processing circuit is so arranged as to perform data processing to determine the sky factor $T(\theta_i)$ for incident light at the plurality of zenith angles ($\theta_i$) by using the following equation (5),

[E5]

$$T(\theta_i) = \frac{\text{number of leaf gap pixels at zenith angle}(\theta_i)}{\text{total number of pixels at zenith angle}(\theta_i)} \quad (5)$$

and to determine the leaf area density (LAD) by using the following equation (2)

[E2]

$$LAD = -2\sum_{i=1}^{5} \frac{\ln(T(\theta_i))w(\theta_i)}{S(\theta_i)}. \quad (2)$$

3. The image capture device for evaluating tree production capacity according to claim 1 or claim 2, characterized in that the semi-spheroid model is an upward-convex semi-ellipsoid of revolution model in which the main trunk of one tree is taken as an axis and a tree height and an average tree crown radius are taken as two radii.

* * * * *